United States Patent
Abdollahian et al.

(10) Patent No.: US 9,576,347 B2
(45) Date of Patent: Feb. 21, 2017

(54) STRUCTURE ANALYSIS METHOD FOR RECOVERING MISSING STRUCTURES IN AN IMAGE AFTER OBJECT REMOVAL

(71) Applicant: SONY CORPORATION, Tokyo (JP)

(72) Inventors: Golnaz Abdollahian, San Francisco, CA (US); Mohammad Gharavi-Alkhansari, San Jose, CA (US)

(73) Assignee: SONY CORPORATION, Tokyo (JP)

( * ) Notice: Subject to any disclaimer, the term of this patent is extended or adjusted under 35 U.S.C. 154(b) by 83 days.

(21) Appl. No.: 14/605,897

(22) Filed: Jan. 26, 2015

(65) Prior Publication Data

US 2016/0217557 A1    Jul. 28, 2016

(51) Int. Cl.
| | |
|---|---|
| *G06T 5/00* | (2006.01) |
| *G06T 7/00* | (2006.01) |
| *G06T 7/40* | (2006.01) |
| *G06T 11/60* | (2006.01) |

(52) U.S. Cl.
CPC ............ *G06T 5/005* (2013.01); *G06T 7/0085* (2013.01); *G06T 7/408* (2013.01); *G06T 11/60* (2013.01); *G06T 2207/10024* (2013.01); *G06T 2207/10028* (2013.01); *G06T 2207/20136* (2013.01); *G06T 2207/20164* (2013.01)

(58) Field of Classification Search
CPC ....... G06T 5/005; G06T 7/0085; G06T 7/408; G06T 11/60; G06T 2207/20164
USPC ........................................................ 382/175
See application file for complete search history.

(56) References Cited

U.S. PATENT DOCUMENTS

| | | | |
|---|---|---|---|
| 4,833,722 A * | 5/1989 | Morton .................. | H04N 1/403 358/464 |
| 5,495,536 A * | 2/1996 | Osbourn ................ | G06K 9/346 382/174 |
| 6,987,520 B2 | 1/2006 | Criminisi et al. | |
| 8,218,893 B2 | 7/2012 | Lim et al. | |
| 8,731,324 B1 | 5/2014 | Huang et al. | |
| 2003/0235341 A1* | 12/2003 | Gokturk ............. | G06K 9/00228 382/243 |
| 2007/0248272 A1* | 10/2007 | Sun ....................... | G06T 7/0083 382/239 |
| 2008/0298714 A1* | 12/2008 | Lee ........................ | G06T 5/002 382/266 |

(Continued)

FOREIGN PATENT DOCUMENTS

KR     20130056407 A     5/2013

OTHER PUBLICATIONS

Arnold ("Interactive Image Repair with Assisted Structure and Texture Completion," IEEE Workshop on Applications of Computer Vision, 2007).*

(Continued)

*Primary Examiner* — Yubin Hung
(74) *Attorney, Agent, or Firm* — O'Banion & Ritchey LLP; John P. O'Banion

(57) ABSTRACT

Image inpainting is controlled in response to a structure analysis and recovery process for a missing object region. Structure edges are detected about the periphery of the removed object area, and extensions determined in response to color and depth information. Intersections are determined in a structure framework, whose regions are then synthesized using a patch filling process, after which remaining areas of the image similarly synthesized.

18 Claims, 18 Drawing Sheets

(56) References Cited

U.S. PATENT DOCUMENTS

| | | | | |
|---|---|---|---|---|
| 2009/0202170 | A1* | 8/2009 | Weiss | G06T 5/005 |
| | | | | 382/275 |
| 2010/0111416 | A1* | 5/2010 | Meiers | G06F 17/30259 |
| | | | | 382/170 |
| 2013/0294697 | A1* | 11/2013 | Nepomniachtchi | G06K 9/6211 |
| | | | | 382/192 |
| 2014/0016870 | A1* | 1/2014 | Kim | G06T 3/403 |
| | | | | 382/199 |
| 2014/0064614 | A1 | 3/2014 | Hung et al. | |
| 2014/0126833 | A1* | 5/2014 | Huang | G06T 5/005 |
| | | | | 382/254 |

OTHER PUBLICATIONS

Masnou et al. ("Level line based disocclusion," IEEE Proceedings Int'l Conf. on Image Processing, Oct. 4-7, 1998, vol. 3, pp. 259-263)—extends into occluded region by pairing T-junctions of level lines with the border of the regions.*

Sun et al. ("Image completion with structure propagation," SIG-GRAPH'05, vol. 24, Is. 3, Jul. 2005, pp. 861-868)—discloses interactive in-painting.*

Bertalmio et al. (Image inpainting, Proceedings of the 27th annual conference on computer graphics and interactive techniques, (2000), pp. 417-424).*

European Patent Office, Extended European Search Report, related EPO Application No. 16150249.6, issued Jun. 16, 2015, pp. 1-9, with claims searched, pp. 10.

Sun J et al, "Image completion with structure propagation", ACM Transactions on Graphics (TOG), ACM, US, vol. 24, No. 3, Jul. 1, 2005, pp. 861-868.

Antonis Katartzis et al, "A Stochastic Framework for the Identification of Building Rooftops Using a Single Remote Sensing Image", IEEE Transactions on Geoscience and and Remote Sensing, IEEE Service Center, Piscataway, NJ, US, vol. 46, No. 1, Jan. 1, 2008, pp. 259-271.

Takashi Shibata et al. "Image Inpainting Based on Probabilistic Structure Estimation", Nov. 8, 2010), Computer Vision—ACCV 2010, Springer Berlin Heidelberg, Heidelberg, Germany, pp. 109-120.

* cited by examiner

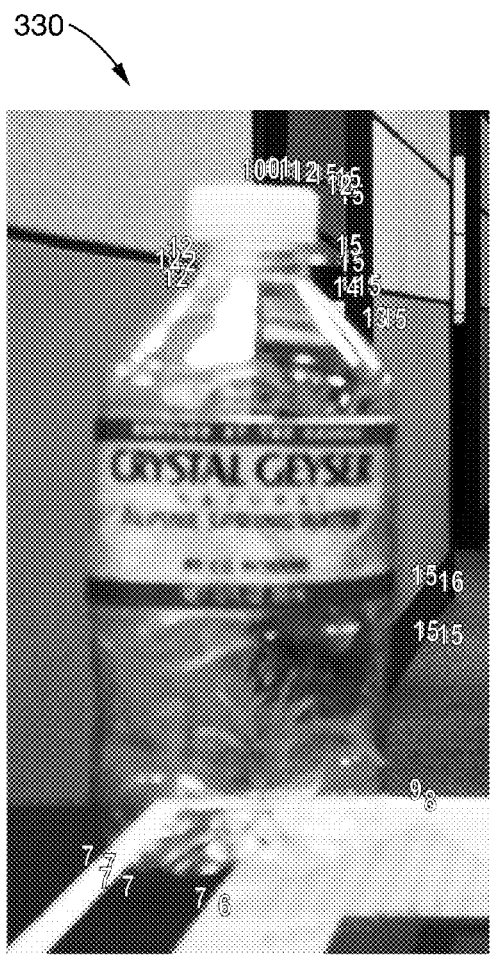
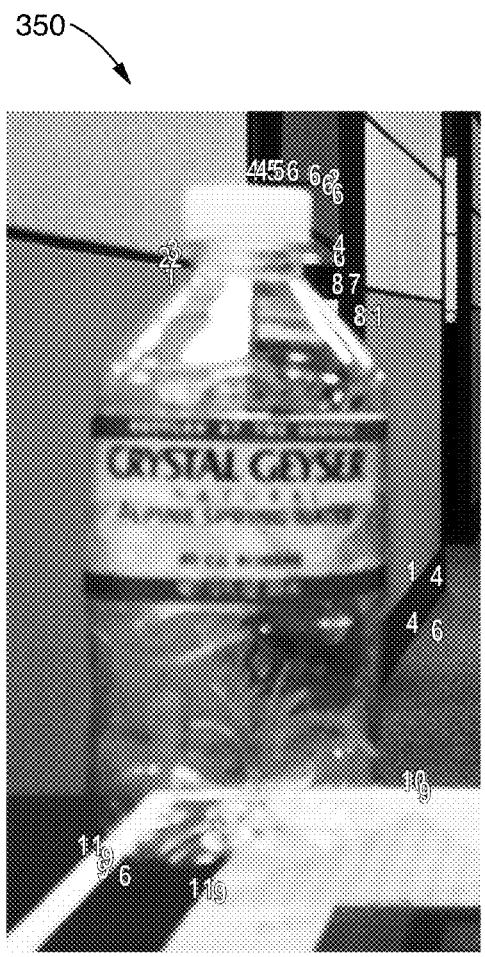
FIG. 18  FIG. 19

STRUCTURE ANALYSIS METHOD FOR RECOVERING MISSING STRUCTURES IN AN IMAGE AFTER OBJECT REMOVAL

CROSS-REFERENCE TO RELATED APPLICATIONS

Not Applicable

STATEMENT REGARDING FEDERALLY SPONSORED RESEARCH OR DEVELOPMENT

Not Applicable

INCORPORATION-BY-REFERENCE OF COMPUTER PROGRAM APPENDIX

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. §1.14.

BACKGROUND

1. Technological Field

This technology pertains generally to image inpainting after object removal, and more particularly to recovering missing structures after object removal from an image.

2. Background Discussion

An image inpainting process involves reconstructing missing parts of an image frame, or video frame, that have been removed, or moved. If an object captured within an image is deleted, or moved, the area that was covered by (obscured by) that object in the original image, has to be reconstructed so that the resulting image still appears "natural" looking. Which is to say that it is desirable that if the viewer has not seen the original image, they would be unable to notice that the image has been altered by removing, or moving an object, therein.

There are a number of current inpainting techniques described in the literature. In general, these methods can be categorized into the following categories: (1) diffusion-based approaches, (2) sparse representation of images, and (3) exemplar-based approaches.

These methods can produce generally suitable outputs when the inpainting process involves homogeneous and/or small areas with no complicated structures. However, in scenes involving large missing areas with multiple occluded regions and structures, these techniques leave visible artifacts in the resultant image, especially in the edge and structured areas.

Accordingly, a need exists for inpainting reconstruction techniques which are able to generate desirable results even for large inpainted areas which include structure.

BRIEF SUMMARY

An apparatus and method are presented for analyzing structures about a missing object area toward recovering structures inside the missing object area and performing inpainting of the missing object according to the recovered structure. The general process involves detecting structural edges, extensions and intersections, the using color and depth information to decide which edges to extend into the missing object area and the extent of extension. The structure lines are then synthesized into the object area, and then the remaining areas are synthesized to complete the inpainting process.

Further aspects of the technology will be brought out in the following portions of the specification, wherein the detailed description is for the purpose of fully disclosing preferred embodiments of the technology without placing limitations thereon.

BRIEF DESCRIPTION OF THE SEVERAL VIEWS OF THE DRAWING(S)

The technology will be more fully understood by reference to the following drawings which are for illustrative purposes only:

FIG. 18 is an image of determining average depth of edges according to an embodiment of the presented technology, and showing these depths superposed on the object image.

FIG. 19 is an image of determining color regions for edges according to an embodiment of the presented technology, and showing these color regions superposed on the object image.

DETAILED DESCRIPTION

The apparatus and method presents a structure analysis approach for recovering the missing structures in an image after object removal. Details are provided for determining the structural 'web' surrounding the object area which has been removed. It should be appreciated that other steps of the inpainting process may be implemented using any desired inpainting technique, such as those described in the literature, including the article by Criminisi, P. Perez and K. Toyama, "Region Filling and Object Removal by Exemplar-Based Image Inpainting," found in IEEE Transaction on Image Processing, 2004.

Generally speaking, in these inpainting processes image holes are filled using patches, such as from other parts of the same image. Thus, a patch in the boundary of the target region (missing object) is filled by the best matching patch from the source region (area outside of the missing object region). In this edge-driven filling order the edges of the removed area are given priority. It will be appreciated that not giving proper priority to structure when filling can result in improper filling, artifacts, and discontinuities.

Figure 1:
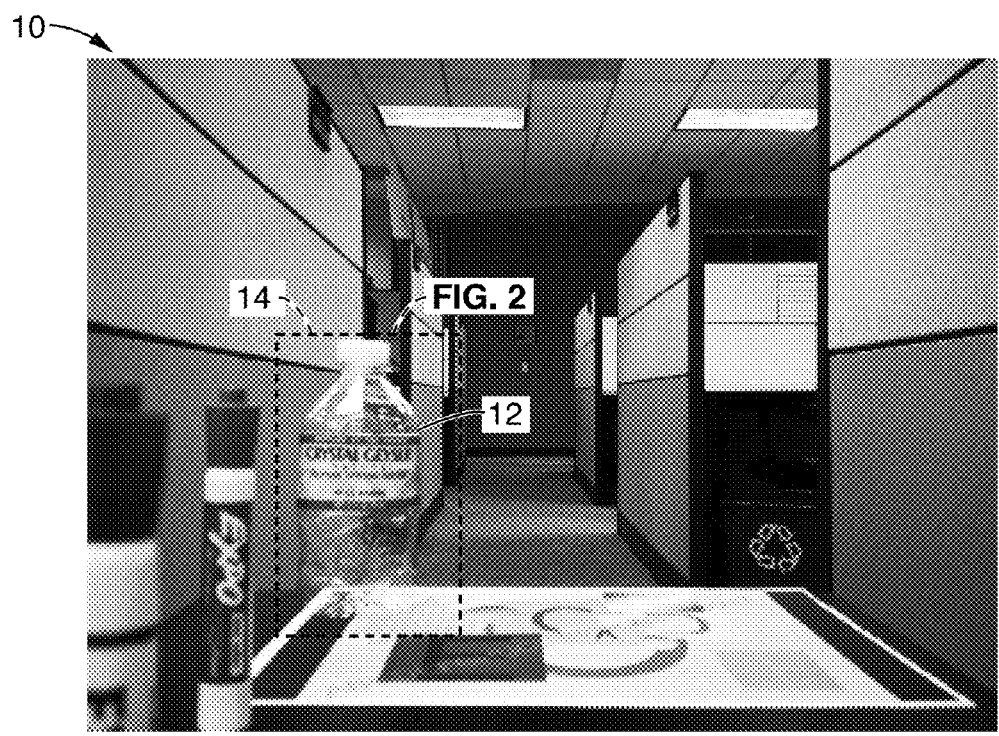
FIG. 1 is an image example used for demonstrating structural analysis and recovery according to an embodiment of the presented technology.

FIG. 1 depicts an example image (or video frame) 10, showing region 14 in which a clear bottle as object 12 are being removed and infilled using an inpainting method.

Figure 2:
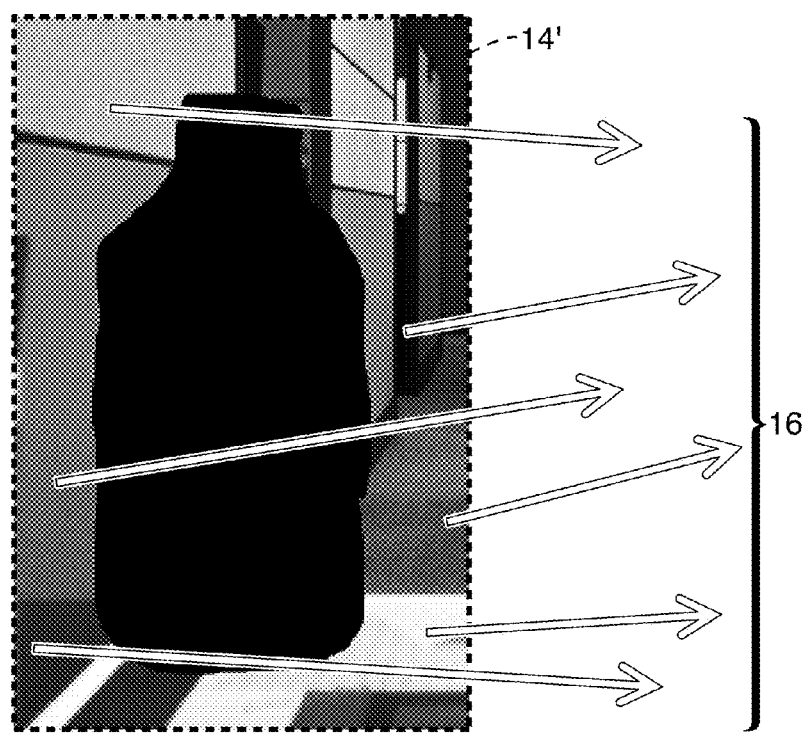
FIG. 2 is an image portion from FIG. 1, showing a removed (water bottle) object example utilized according to an embodiment of the presented technology, and depicting numerous structural elements.

FIG. 2 depicts a close-up portion 14' of the area surrounding the clear bottle object, which has been removed leaving a black silhouette (i.e., a two-dimensional representation of object outline as a cutout or configurational drawing, uniformly filled in with black) of the clear bottle object. A number of surface structures 16 can be seen in the figure reaching the object boundary. The problem arises as to how the inpainting process can automatically determine which of these surfaces to propagate inside of the missing region (e.g., silhouette), how far they should be propagated and how to handle interactions between structures (e.g., intersections). A number of problems arise during inpainting if the order of filling associated with relevant structures is not known. Various forms of artifacts arise in response to these problems.

Figure 3:
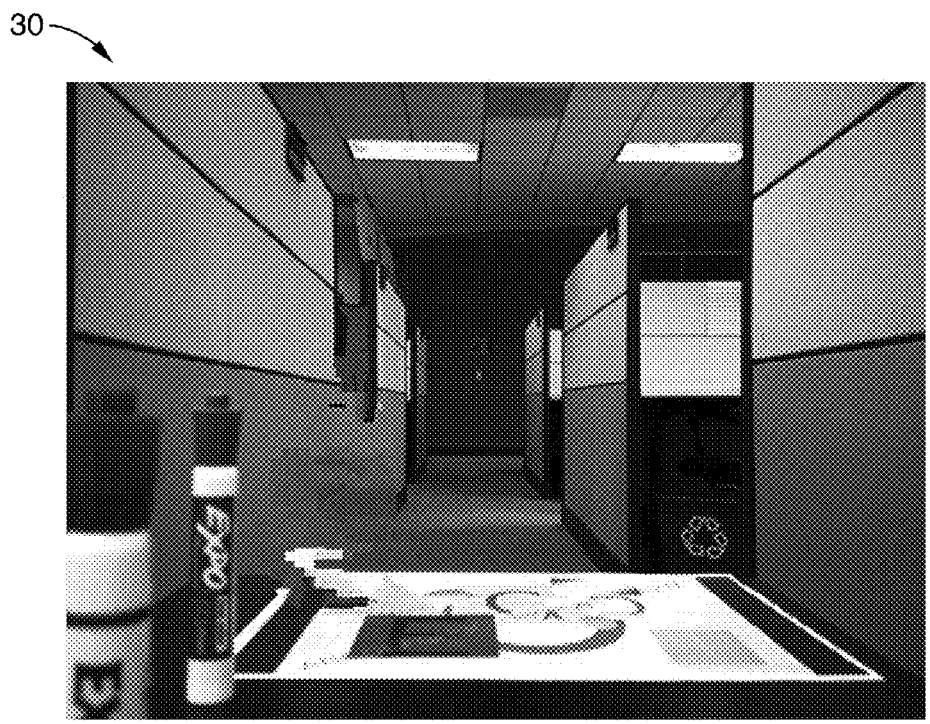
FIG. 3 is a inpainted image showing numerous artifacts and improper fills arising when structure is not properly reconstructed.

FIG. 3 depicts an image 30 of FIG. 1 after object removal and an inpainting process which does not properly take structures into account. It can be seen from the image that the result of inpainting exhibits a substantial area of artifacts, while destroying the structure which was previously occluded by the water bottle object.

Toward overcoming these problems the present disclosure performs an analysis to recover missing structures to which the inpainting process is then directed. The missing structures are determined on the basis of structure edges, extensions and intersections. The combination of surfaces between recovered structure edges are then filled in a proper order to complete filling of the missing object area.

Figure 4:
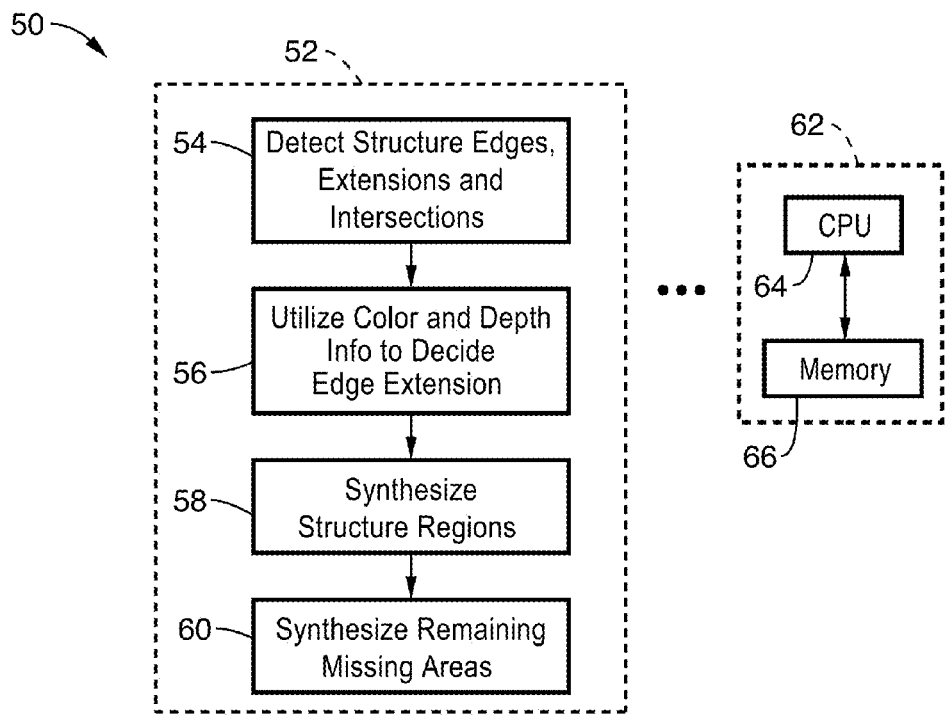
FIG. 4 is a flow diagram of the general inpainting process utilizing structure analysis and reconstruction according to an embodiment of the presented technology.

FIG. 4 illustrates an example embodiment 50 of the structure analysis for this disclosure. Programming 52 is shown for execution on a processing means 62, having at least one computer processor 64 and at least one memory 66. Programming executable on processor 64 are shown executing the following steps of the disclosed method. Structure edges are detected 54 along with their extensions and intersections. Information about color and depth (e.g., depth map) are utilized for determining 56 which edges require extension, and to what extent they should be extended. The structure regions are synthesized 58, followed by synthesizing 60 the remaining regions (e.g., homogeneous regions).

It should be appreciated that the image processing of the present disclosure may be performed by one or more computer processors operating in conjunction with one or more memories, such as within one or more external or internal computer circuits or devices. It will be appreciated that programming stored on memory, which includes various solid state memory and computer-readable media, as executable on the computer processor(s). The present technology is non-limiting with regard to memory and computer-readable media, insofar as these are non-transitory, and thus not constituting a transitory electronic signal.

Figure 5:
FIG. 5 is an image showing desired structural lines within a silhouette of the missing bottle object for an embodiment of the presented technology.

FIG. 5 illustrates the inventive object of extending 70 structural lines through missing object area 72. Structural edges are first determined which are adjacent the removed object area, as edges which intersect the object's boundary. These edges can be classified in three general categories. (1) Structure edges are those edges which usually come from objects' boundaries, prominent edges on the object surfaces, and the like. (2) Texture edges are those edges which arise in response to texture patterns, and are typically short and curvy. (3) Short edges are those that arise from noise and variance in illumination. In discerning structure occluded by the missing object in this disclosure, it is the structural edges which are being considered and not the other forms of edges. The disclosed system discerns between these types of edges.

Figure 6:
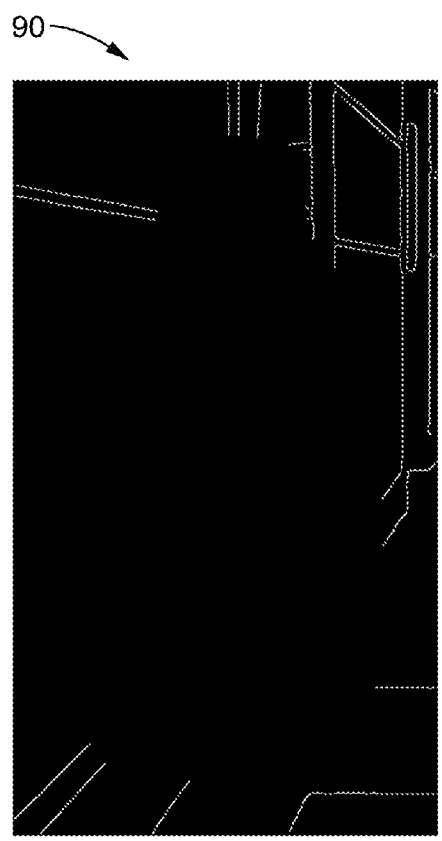
FIG. 6 is a line-abstraction image showing only the structural edges outside of the missing object area according to an embodiment of the presented technology.

FIG. 6 depicts a portion 90 of FIG. 1, showing area surrounding a removed object with structure lines outside of that area shown by themselves.

Figure 7:
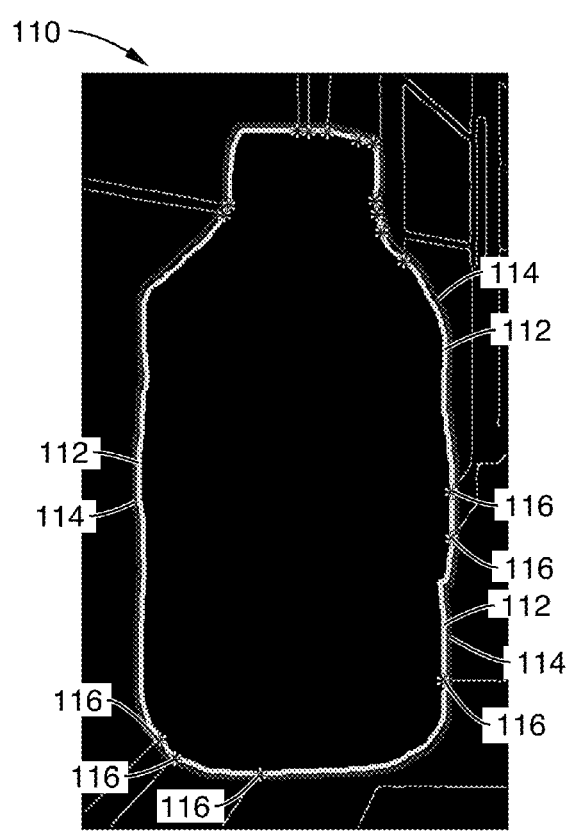
FIG. 7 is an image of the missing object area along with boundary, mask and edge intersections determined according to an embodiment of the presented technology.

FIG. 7 depicts determining a bounding box 110 for the removed object, and the image is cropped around the object with some added margins, such as according to predetermined thresholds (e.g., fixed number of pixels, percentage of the average image size, variable based on image and/or application). A process is then started to detect edges and their starting points. An object mask 112 is seen up to the edge of the missing object area, with an external surrounding area 114 just beyond the mask (outside of the missing object area). Edge points 116 are determined within mask 112 where structure reaches the removed object exterior.

Figure 8:
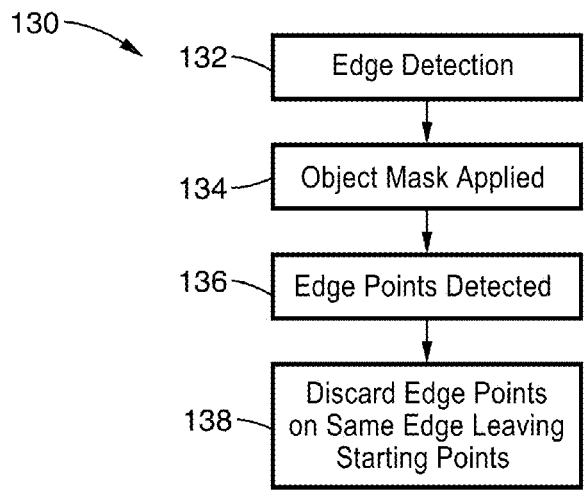
FIG. 8 is a flow diagram of edge detection according to an embodiment of the presented technology.

FIG. 8 illustrates the process of detecting edges 130 and their starting points. Edge detection 132 is applied, then an object mask 134 is generated which is seen as the inner contour in the figure. Edge points between the red contour are detected 136. Edge points are discarded 138 which are on the same edge and output a result with the starting point of each individual edge that enters the object mask, as shown by the dots (asterisks) seen in the mask region.

Figure 9:
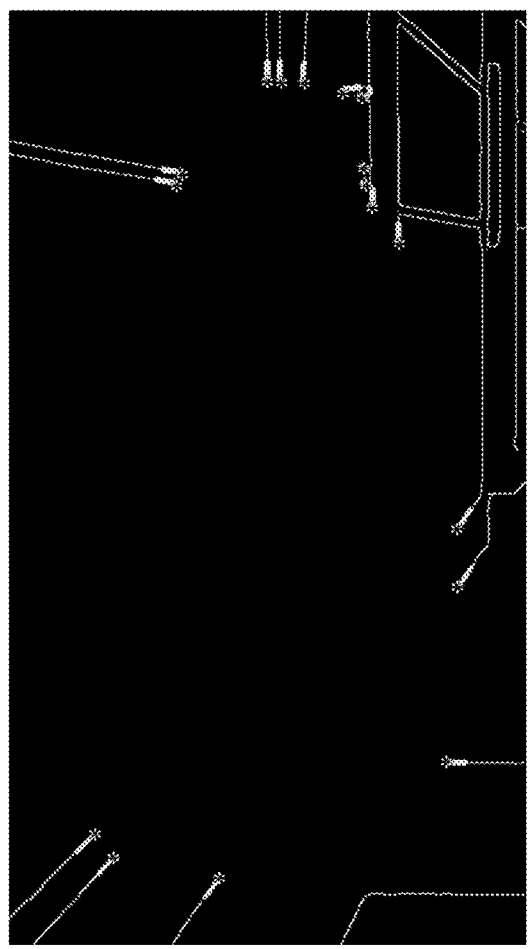
FIG. 9 is an image showing edge tracing according to an embodiment of the presented technology.

FIG. 9 illustrates an example 150 of tracing edges from the points seen in FIG. 8 from the mask area outward from the object region.

Figure 10:
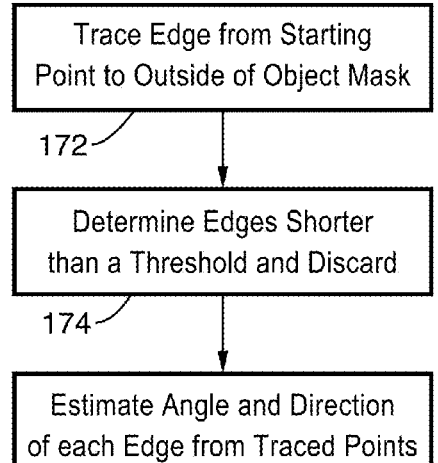
FIG. 10 is a flow diagram of edge tracing according to an embodiment of the presented technology.

FIG. 10 illustrates an example embodiment 170 of edge tracing, which traces edges 172 from the starting point toward the outside of the object mask for a desired length. By way of example and not limitation the length of this tracing can be configured for a given number of pixels, a percentage of object dimensions, or use any desired predetermined, and/or selectable criterion without departing from the teachings of the present technology. If an edge is detected to be shorter than this desired length, then it is discarded 174 from any additional analysis. Estimation 176 of the angle and direction of each edge is determined by tracing the points.

Figure 11:
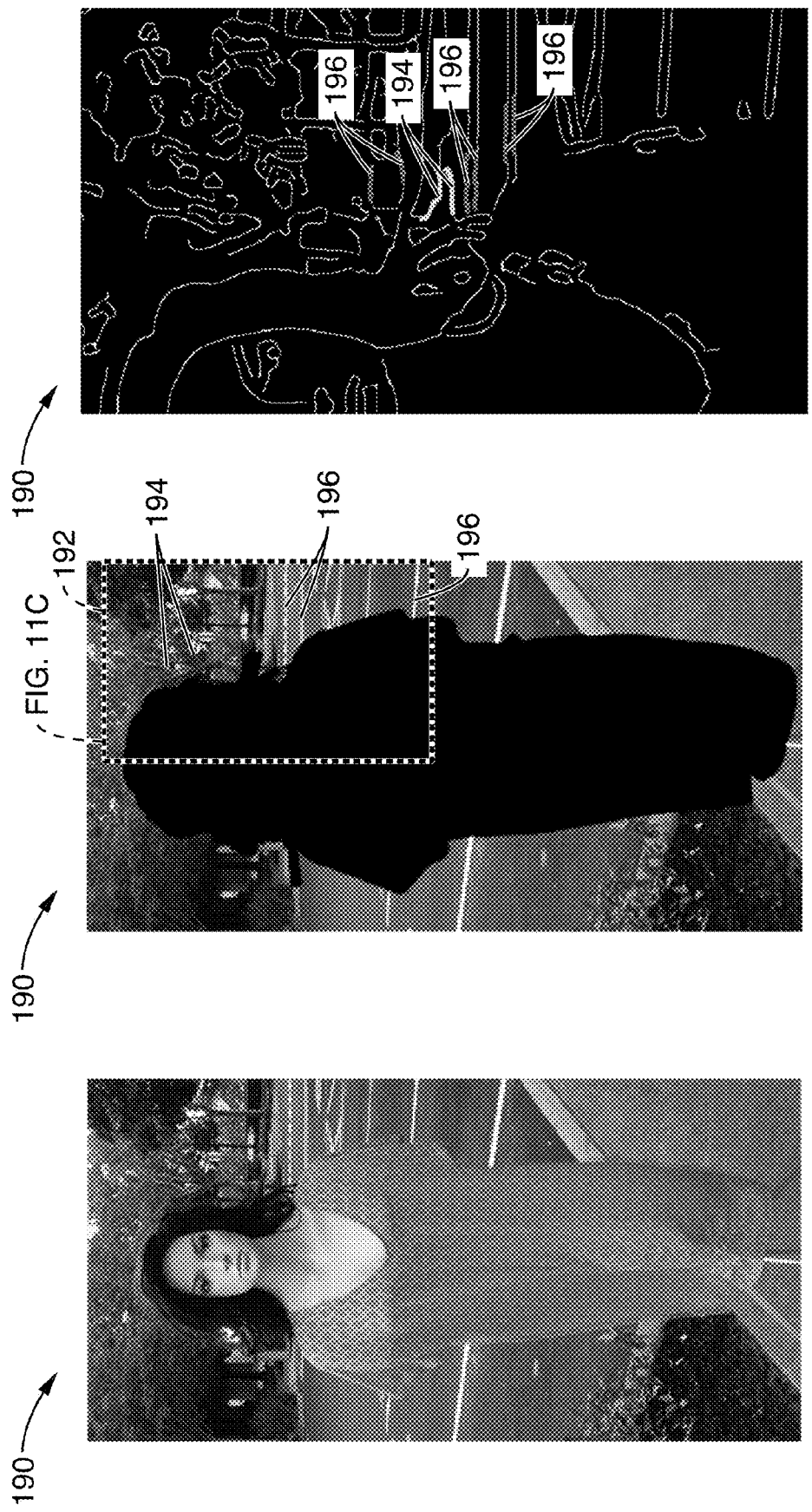
FIG. 11A through FIG. 11C are images illustrating distinguishing between texture and structure edges according to an embodiment of the presented technology.

FIG. 11A through FIG. 11C are example images 190 that illustrate an important characteristic of determining structure edges. In FIG. 11A, an image is seen of a dress manikin object. In FIG. 11B the object is removed, leaving an object silhouette. In an area 192 of the object area, one can see examples of texture edges 194, which corresponded to the periphery of the hair of the manikin. In a lower portion of area 192, one sees structure edges 196 from the background. FIG. 11C depicts close up details of the relevant texture 194 and structure 196 edges. The present disclosure discards edges that are too short, or that are insufficiently straight to be considered structure edges.

Two straightness criteria are utilized to determine if these lines are structure or texture. In a first criterion, the line angle should remain substantially the same on the traced edge.

Figure 12:
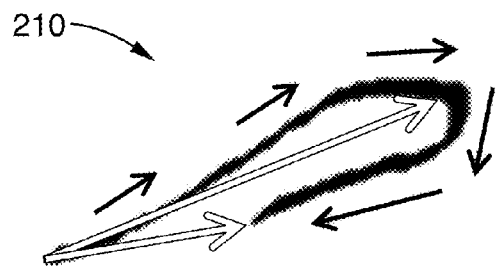
FIG. 12 and FIG. 13 are images depicting one of the straightness criterion upon which candidate edges are tested according to an embodiment of the presented technology.
Figure 13:
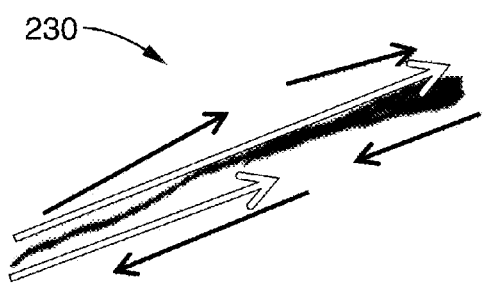

FIG. 12 and FIG. 13 depict characteristics 210, 230, of a second straightness criterion. For some short edges, when the tracing algorithm reaches the end, it falls back on the same edge and traces the edge backward. This means that such edges pass the first straightness criterion. Thus, we add another criterion:

$$\|p_i - p_0\| \geq \max_{k \in \{0, \ldots, i-1\}} (\|p_k - p_0\| - c),$$

in which $p_i$ is the current point, $p_0$ is the edge starting point, and c is a constant, for example a value between 0 and 4.

Figure 14:
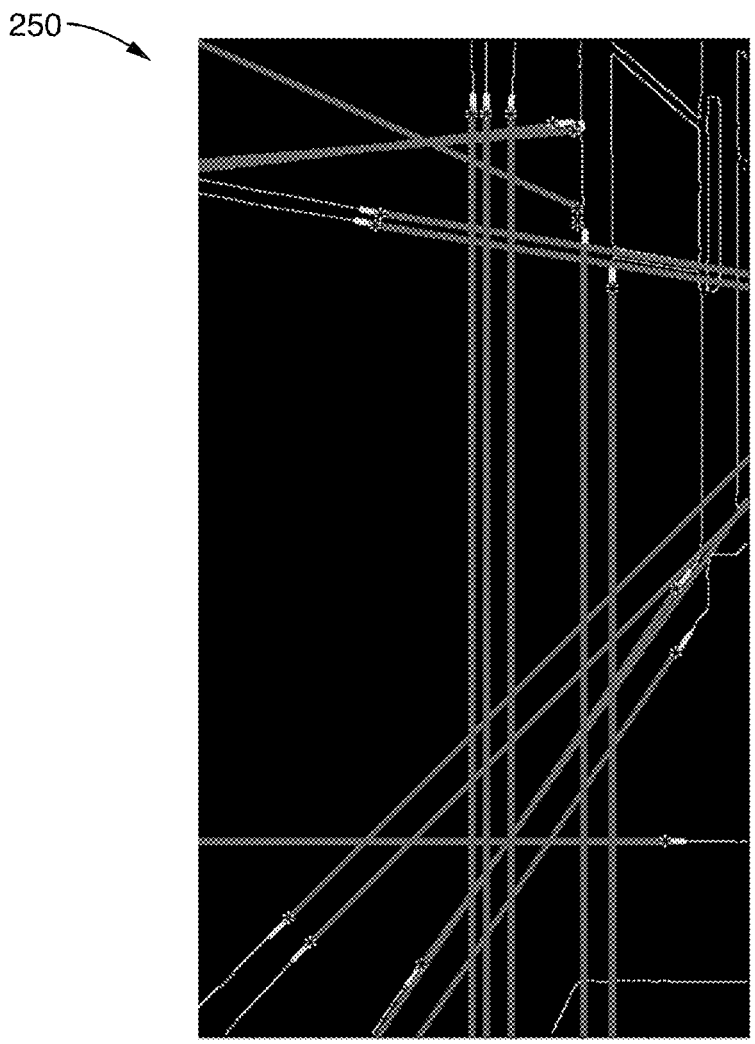
FIG. 14 is an image of extending structure edges through the interior of the missing object region according to an embodiment of the presented technology.

FIG. 14 illustrates extending structure edges 250 and finding valid intersections. The angle and direction of these segments is estimated and each edge is extended inside of the object mask.

Figure 15A:
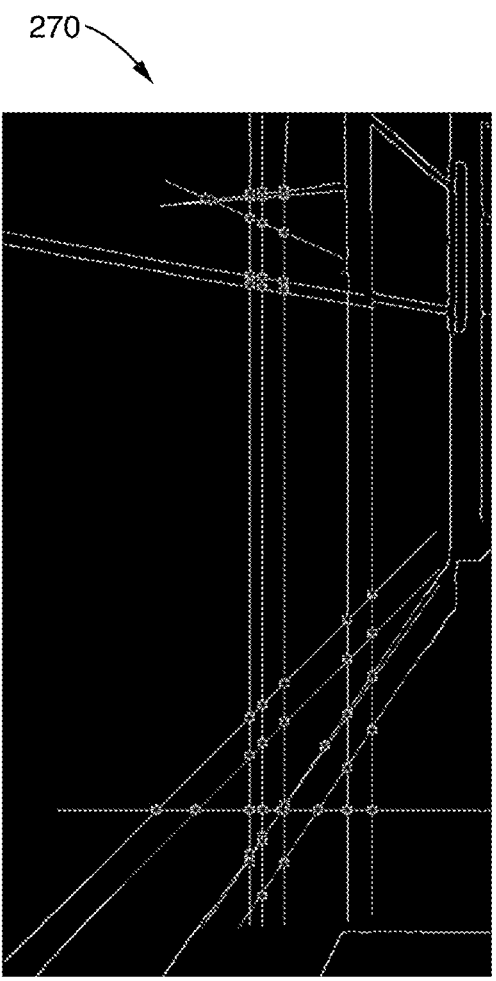
FIG. 15A and FIG. 15B are images showing finding possible edge intersections according to an embodiment of the presented technology, shown in abstractions upon structure lines (FIG. 15A), and superposed upon the original bottle object image (FIG. 15B).
Figure 15B:
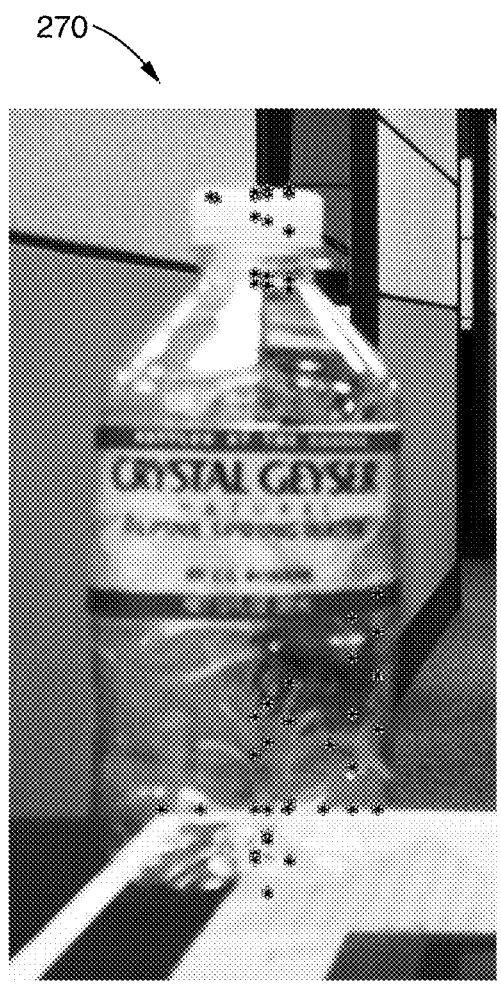

FIG. 15A and FIG. 15B illustrate 270 finding all possible edges intersections between the edges within the object mask. These intersections are shown in relation to the edges shown in isolation in FIG. 15A, and superposed on the object itself in FIG. 15B from a portion of the original image.

Figure 16:
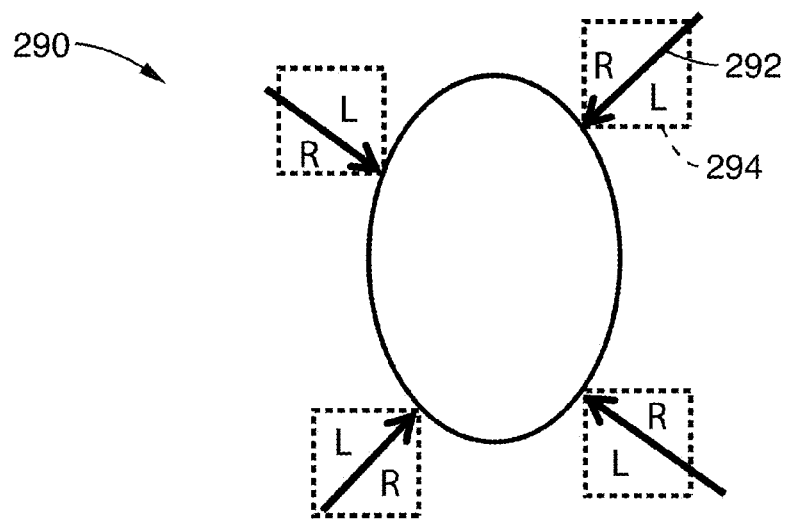
FIG. 16 is a diagram of considering both sides of edges within a local area according to an embodiment of the presented technology.

FIG. 16 illustrates 290 that the present disclosure considers two sides for each edge, these by way of example being named left (L) and right (R), in relation to a facing direction of an edge 292 into the object mask. The method determines average depth and color values for each side of the edge in a small neighborhood 294 around the object boundary. It should be appreciated, that although the present technology was tested using the Lab (i.e., CIELab) color space, that other color spaces may be utilized without departing from the teachings of the present technology (e.g., RGB, CMYK, YUV, YIQ, YCbCr, YPbPr, YDbDr, CIE, HSV, HSL, and so forth).

Figure 17:
FIG. 17 is an image of color values about the boundary about the object area utilized according to an embodiment of the presented technology.

FIG. 17 illustrates 310 that color values (although depicted monochromatically) are determined about the border of the object region.

FIG. 18 illustrates 330 determining average depth of the relative edges, and one sees in the figure values from 6 to 16 in pairs with a depth determined to each side of the edge. The average depth on each side of each edge within a small window is determined around the starting point of the edge. Depth information is used to determine the priority of the edges, with edges closer to the camera having higher priority than those farther away. This determination of depth is described in another Sony application relating to inpainting.

FIG. 19 illustrates 350 overlaying color classes on each side of the edges as seen in the figure exemplified with values from 1 to 11.

Figure 20:
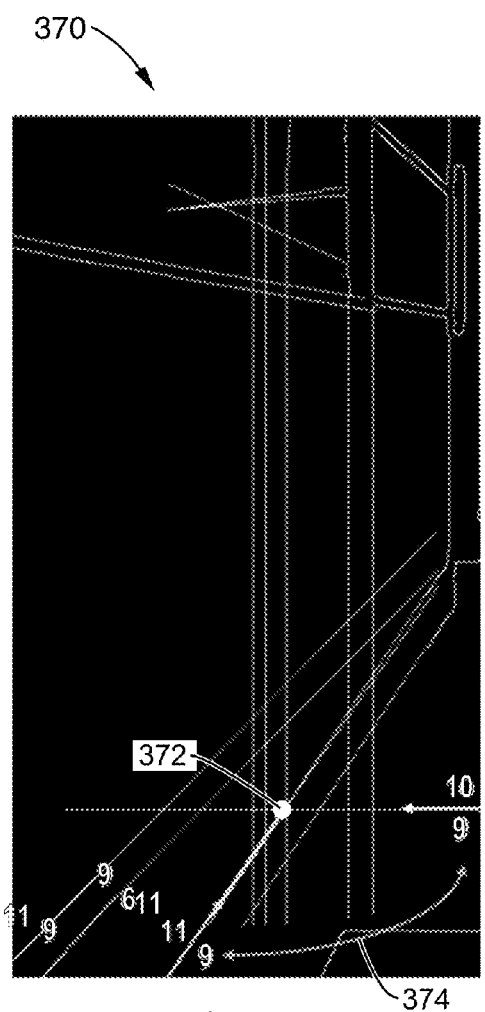
FIG. 20 is an abstract image of determining a valid intersection according to an embodiment of the presented technology.

FIG. 20 illustrates 370 determination of valid intersections based on matching color (or sufficiently matching color). The method considers that two edges can have a valid intersection only if their colors match on the same side of the intersection. In the figure, one intersection 372 is validated as the same color class (9) is found 374 on both sides of the region, thus the region passes the consistency constraint. This process of finding valid intersections starts with the closest edge to the camera.

Figure 21:
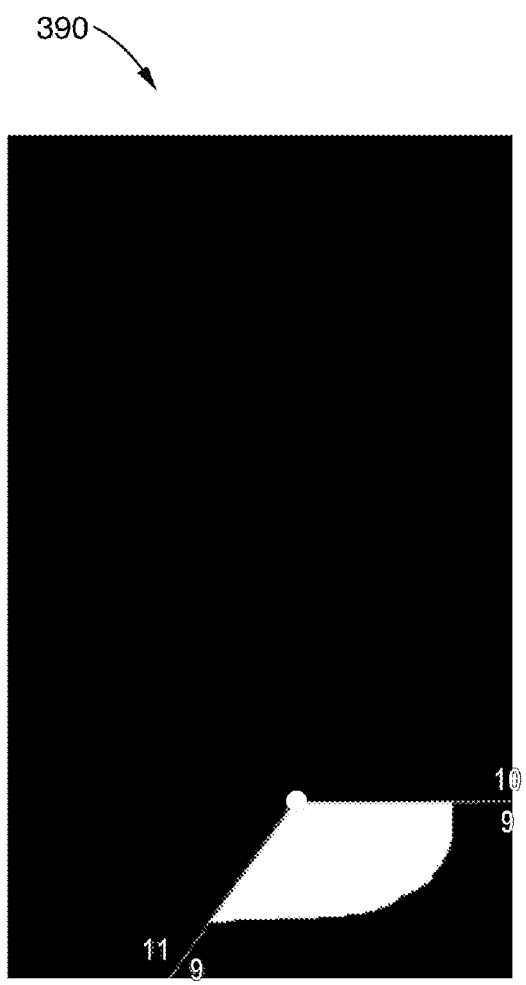
FIG. 21 is an abstract image of masking a structural area associated with a valid intersection according to an embodiment of the presented technology.

FIG. 21 illustrates 390 defining areas of structure extending from valid intersections through which other edges (having lower depth priority) cannot cross. The figure highlights the corner of this structure region.

Figure 22:
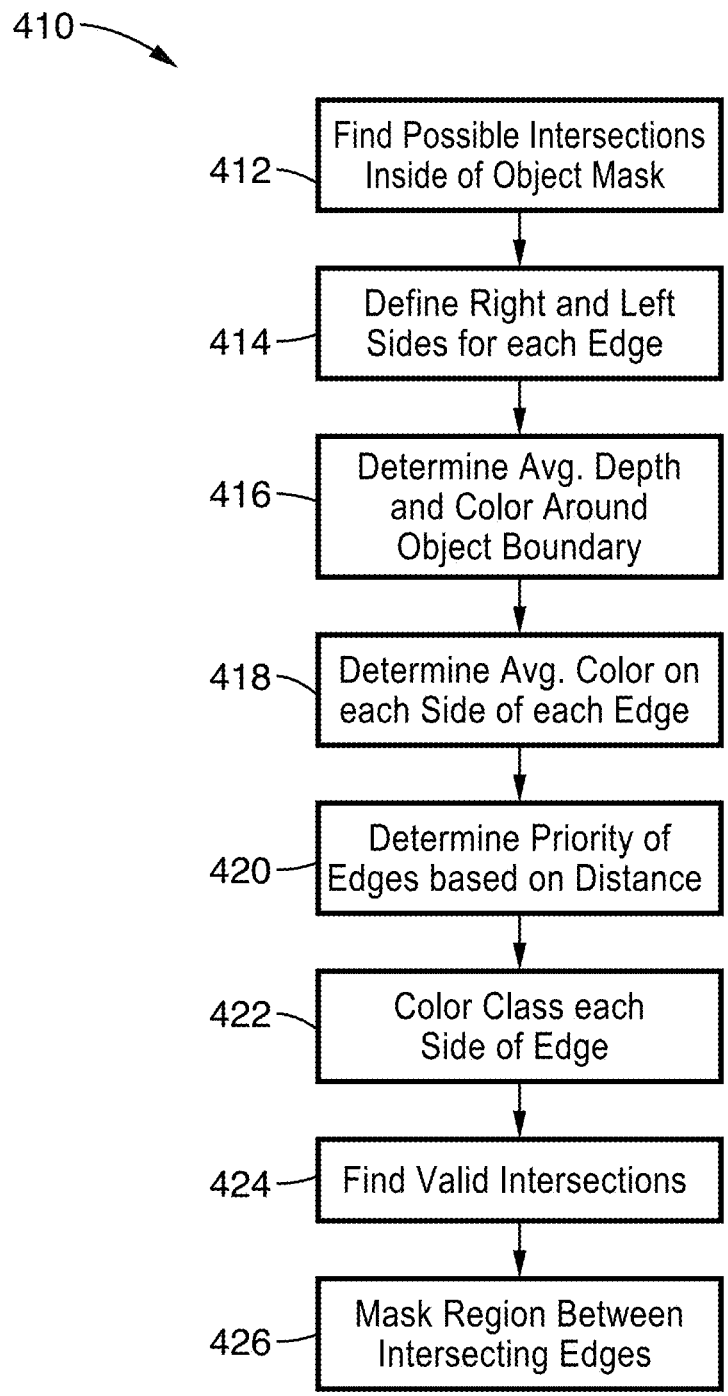
FIG. 22 is a flow diagram of the process of finding intersections to masking the region between valid intersections according to an embodiment of the presented technology.

FIG. 22 illustrates an example embodiment 410 of this process from finding intersections to masking the region between valid intersections. All possible intersections inside of the object mask are found 412, and sides for each edge are defined 414. Average depth and color around the object boundaries are found 416, and average color 418 on each side of the edges. The priority of the edges is then determined 420 in response to distance (e.g., focal distance from the camera), and color classes defined for each side of each edge 422. Valid intersections are found 424 and the region masked 426 between these intersecting edges to prevent other edges from crossing through the area.

The method then provides for the synthesis of the edge regions. A patch matching method is used to synthesize the edges, with edges being filled in the order they have been processed (i.e., closest edges first). After filling the edges, the remaining regions are filled. A multi-resolution search is utilized to accelerate the filling process. Toward optimizing execution and enhancing results, limitations are placed on patch search area.

Figure 23:
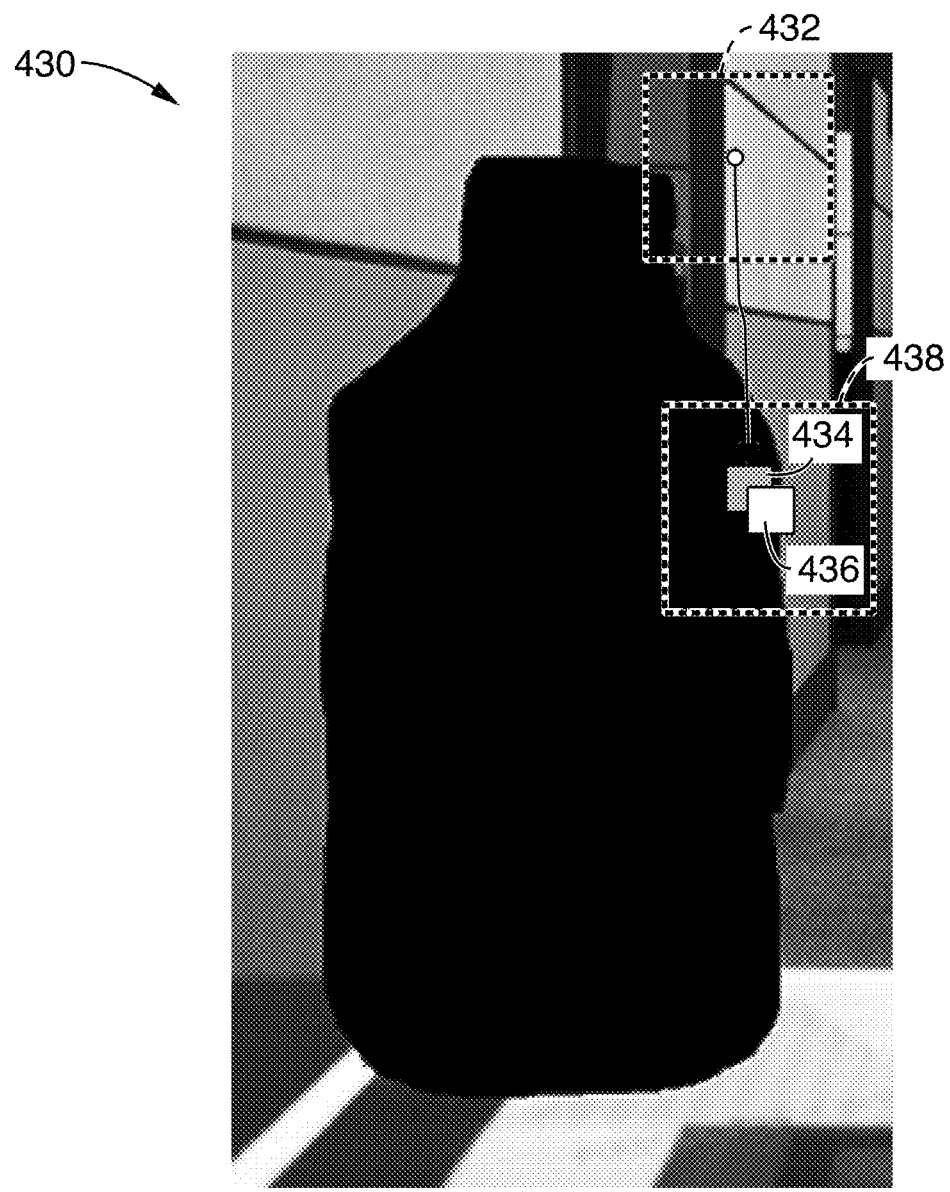
FIG. 23 is an image showing a patch matching search process according to an embodiment of the presented technology.

FIG. 23 illustrates 430 an example search process. In this search information is retained about where previous patches were obtained, so that the area may be utilized as a possible location for the current patch. In the figure, an upper location 432 is seen from which a patch was obtained for use in location 434, within a patch matching area 438 in progress. For a subsequent patch 436, a patch can be tried from upper location 432 again as this information has been retained.

Figure 24A:
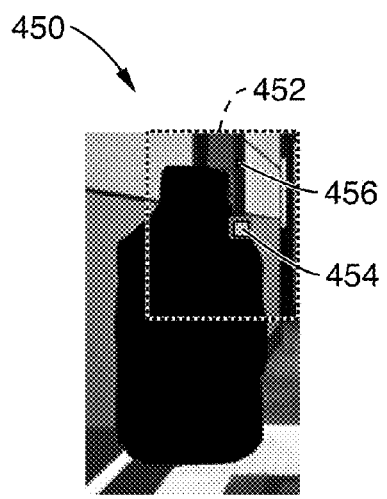
FIG. 24A through FIG. 24C are images showing the patch matching search process as a multi-resolution search according to an embodiment of the presented technology.
Figure 24B:
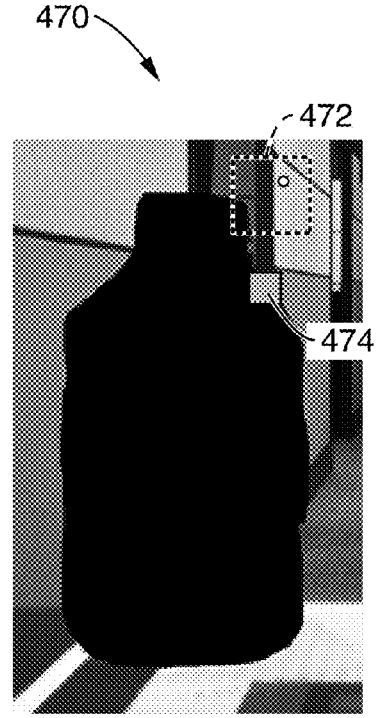
Figure 24C:
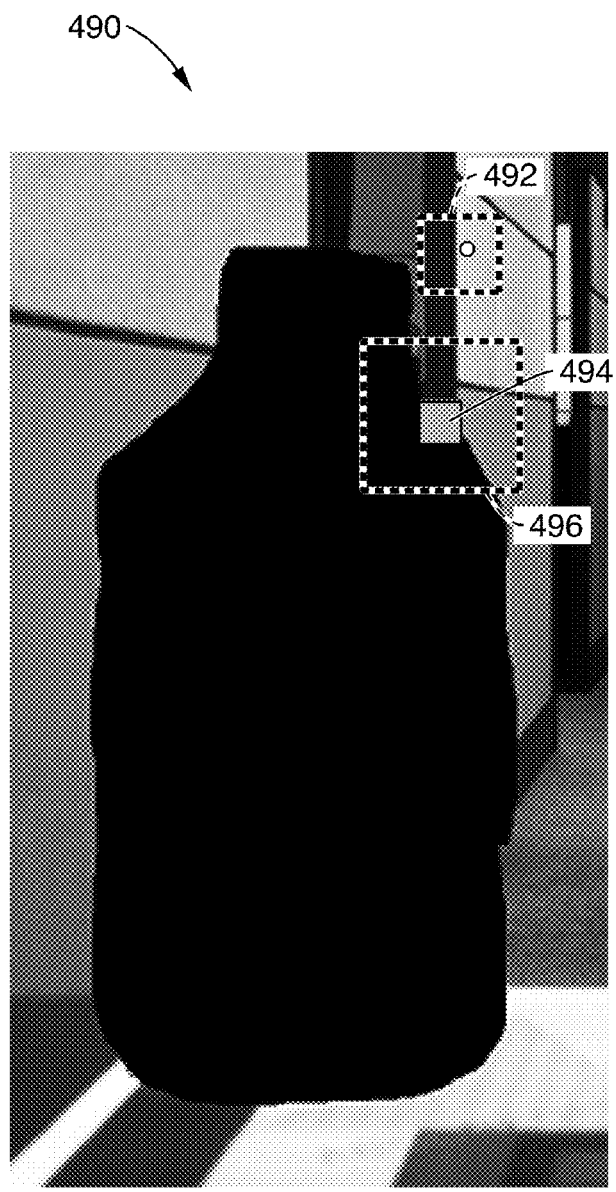

FIG. 24A through FIG. 24C illustrate certain important elements of the search process. It will first be noted that the search is preferably performed as a multi-resolution search, FIG. 24A showing an example 450 at a lowest resolution, FIG. 24B showing an example 470 at a mid resolution, FIG. 24C showing an example 490 at highest resolution. The search is substantially sped up by starting the search process at a low resolution, then moving up to higher resolution when seemingly suitable candidate patch areas are found. It should be appreciated that a different number of resolution, and/or different resolution ranges, of this search can be utilized without limitation and without departing from the teachings of the present disclosure. At each stage the result is modified by searching around the solution of the previous stage. In FIG. 24A a search area 452 is defined around area 454 being infilled. A candidate area 456 is found for infilling. At a medium resolution 470 in FIG. 24B, the search area is constrained 472 for area 474 being infilled. Finally, at the highest (e.g., original) resolution in FIG. 24C, search area 492 is still maintained from which patches are being filled at the current infilling location 494, and the search is also performed nearby 496, that patch filling location.

Figure 25:
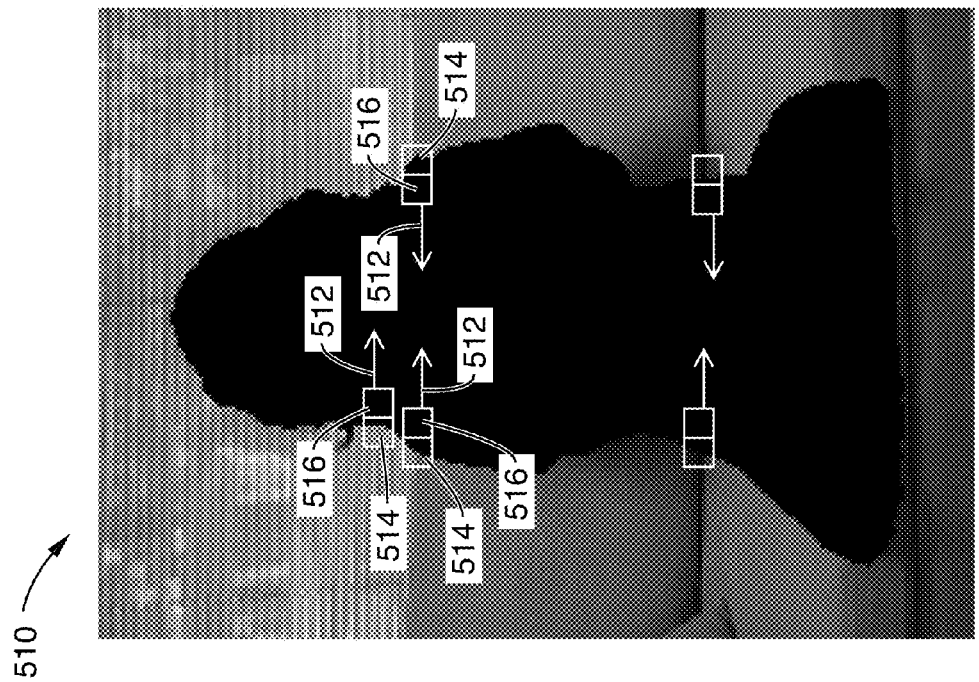
FIG. 25 is an image of another object inpainting example showing patch filling from the edges according to an embodiment of the presented technology.

FIG. 25 illustrates 510 that the technology presented seeks to fill the entire edge with similar colors to that of the starting point of the edge. Example edges 512 are shown in the figure with a block 514 at the border of the missing region and its adjacent patch fill 516.

In this process edge points and their extensions are labeled so that it is known which edge an edge patch belongs to. For the first few patches of each edge, below a desired threshold (e.g., 5), the matching process is performed as it was previously performed. For the remaining patches on the edge, a default location is set as the matched location of the starting point, about which the search is performed in addition to a small search area around the target patch.

Figure 26:
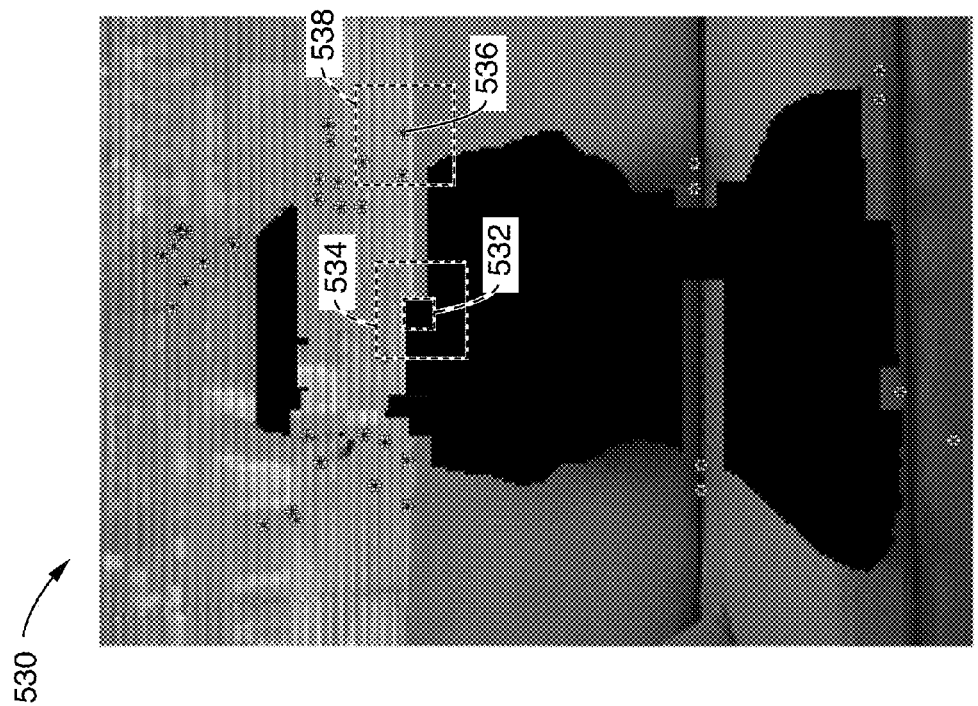
FIG. 26 is an image of the missing object in FIG. 25 being inpainted based on the patch search process according to an embodiment of the presented technology.

FIG. 26 illustrates an example image 530 of filling edge patch as shown in progress for the object region seen in FIG. 25. Inpainting is shown in progress for a target patch being filled 532, with a search window 534 around that area (e.g., to a desired number of pixels, patches, or other sizing constraint). A match location 536 is found for the edge starting patch, and a search window 538 retained for later searches.

Figure 27D:
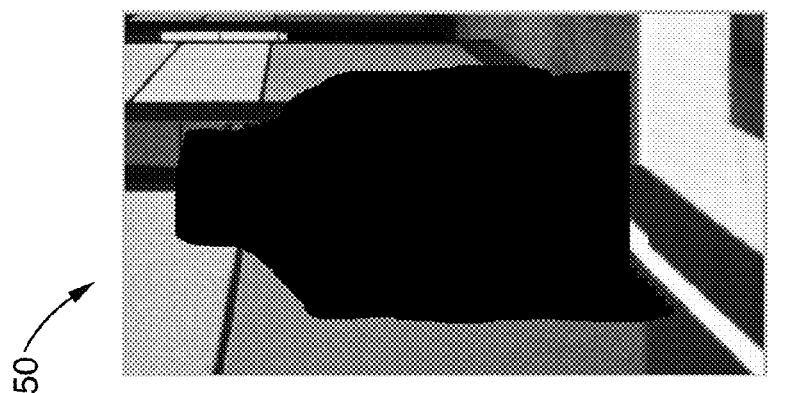
FIG. 27A through FIG. 27D are a sequence of images showing extension of structure lines (FIG. 27A), filling along edges in a first direction (FIG. 27B), filling along an edge in another direction (FIG. 27C), and then filling of the area within the defined structure (FIG. 27D) as performed according to an embodiment of the presented technology.
Figure 27C:
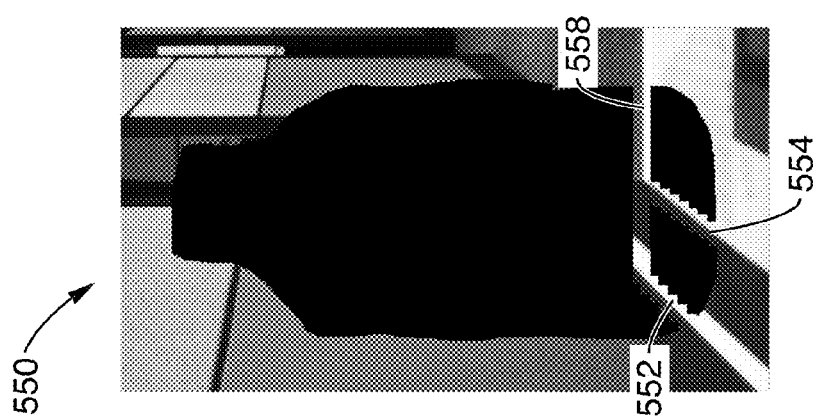
Figure 27B:
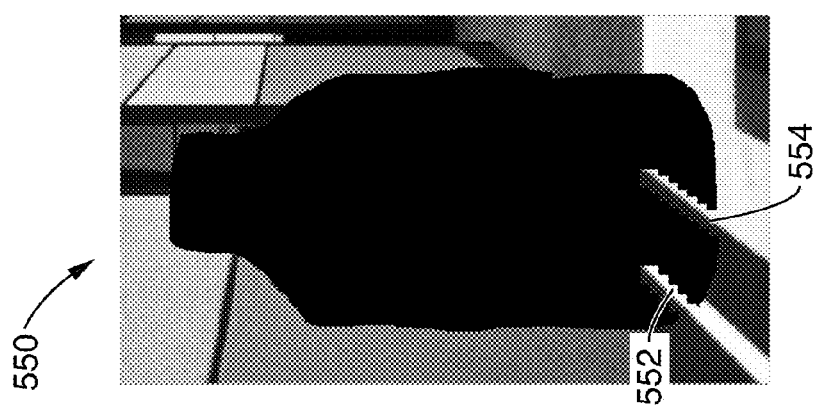
Figure 27A:
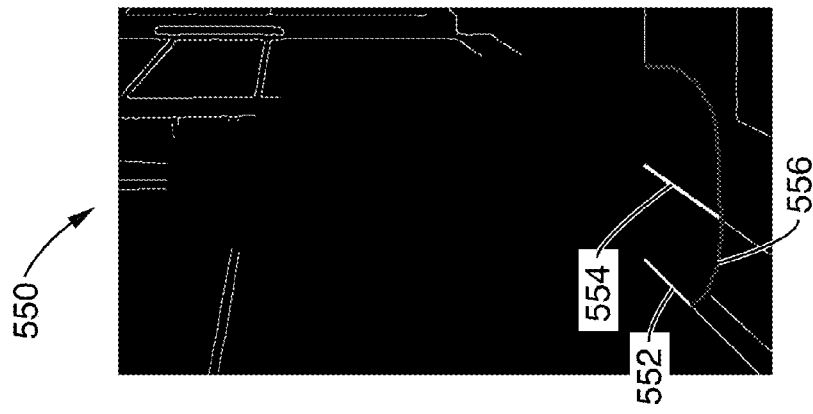

FIG. 27A through FIG. 27D depict a progression of edge filling 550. In FIG. 27A, one sees the abstraction of missing object area and surrounding structure lines, in which extended edges 552, 554 are seen extending past object boundary 556 into the interior of the object region. In FIG. 27B, extended edges 552, 554 have been filled with patches. In FIG. 27C, a structure edge fill is seen 558 extending in from the right to intersect edges 552, 554. Finally in FIG. 27D, since all valid structure lines in this lower section have been extended, the areas defined within these structure lines are filled.

Figure 28:
FIG. 28 is an image showing the result of an inpainting process performed utilizing structure analysis and reconstruction according to an embodiment of the presented technology.

FIG. 28 illustrates an example image 570 of these inpainting results after all the structure lines, and the areas defined therein, have been filled according to the presented technology. In comparing this figure with FIG. 1, it can be seen that the structure and areas occluded by the bottle have been inpainted in a proper order within a proper structural framework.

Figure 29:
FIG. 29 is an image of another inpainting situation, showing three stuffed animals on a table top.
Figure 30:
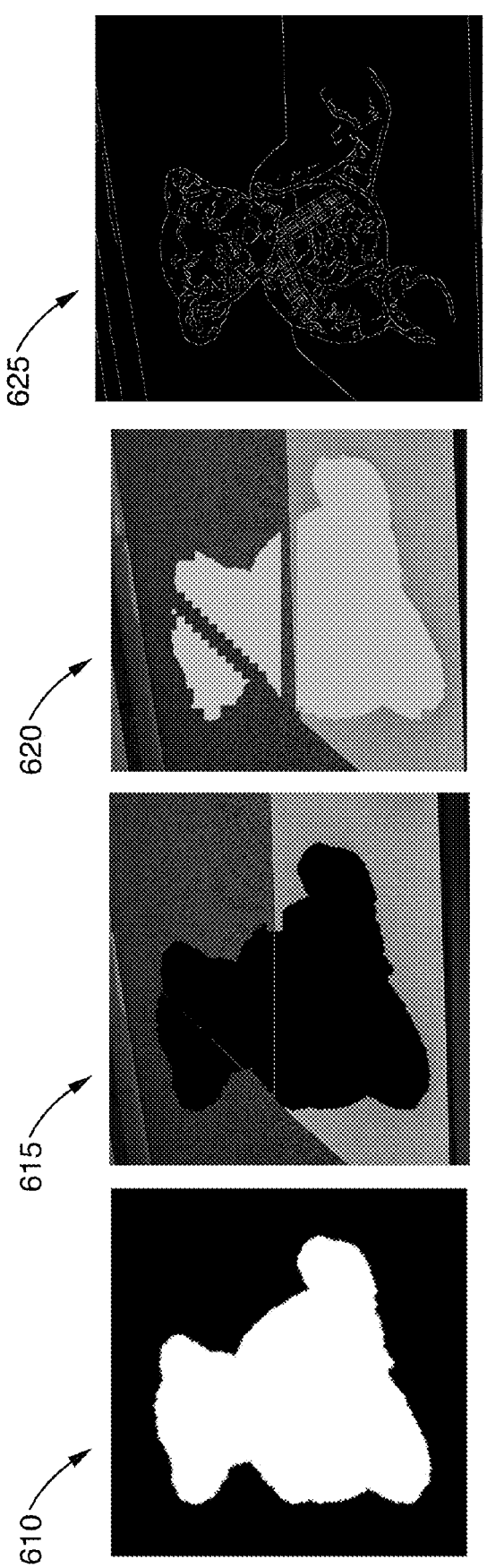
FIG. 30A through FIG. 30D are a sequence of images showing steps in masking a removed object, structure analysis and inpainting according to this structure according to an embodiment of the presented technology.

FIG. 29 illustrates another example of this inpainting process on example image 590 which shows three stuffed animals on a table top. The left most object (bear stuffed animal) is to be removed and infilled. FIG. 30A through FIG. 30D illustrate the process of masking out and filling the bear object seen in the image of FIG. 29. In FIG. 30A is an example 610 of an object mask defined on the bear object. In FIG. 30B, an example 615 is seen of generating an edge map by an edge detector. In FIG. 30C, an example image 620 shows continuing structural edges through the interior of the bear object. Then in FIG. 30D, an example 625 is seen of patch filling the edges running through the bear object, after which the remaining structure is filled to provide the results seen in the next figure.

Figure 31:
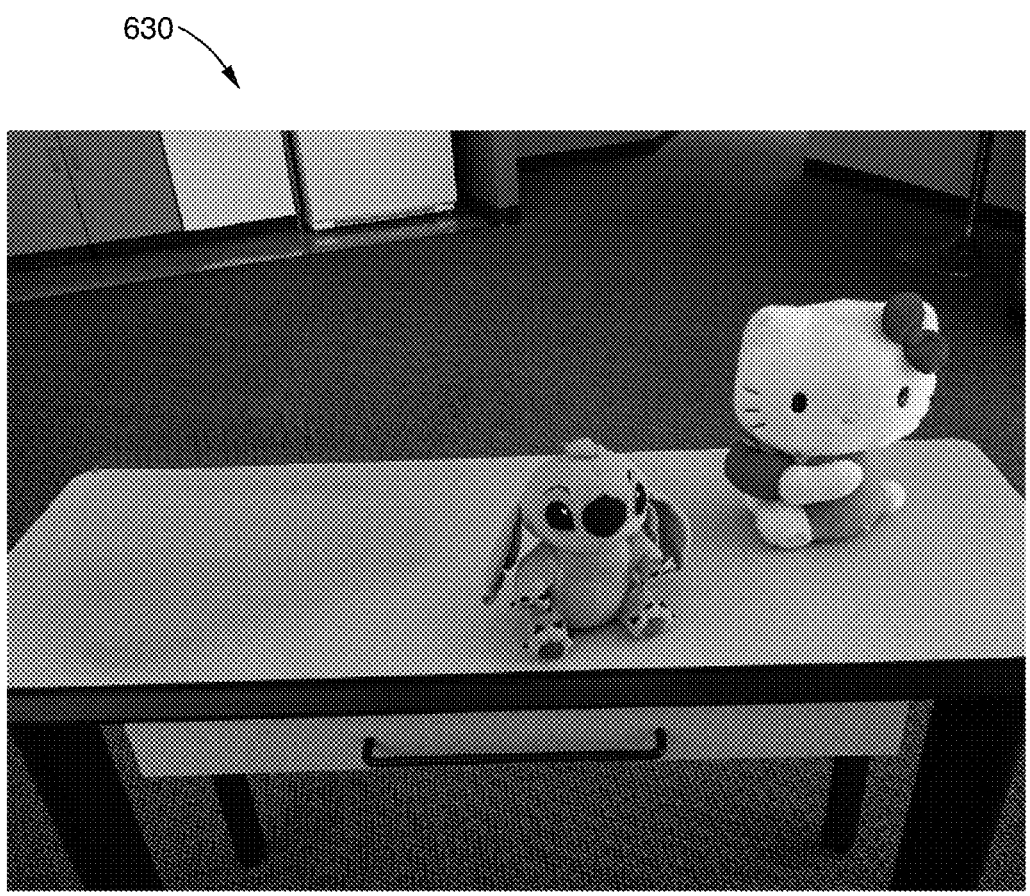
FIG. 31 is an image resulting from the inpainting process shown in FIG. 30A through FIG. 30D, according to an embodiment of the presented technology.

FIG. 31 illustrates an example 630 inpainted image derived from FIG. 29 after removing the bear object and performing the steps outlined in the present disclosure.

Embodiments of the present technology may be described with reference to flowchart illustrations of methods and systems according to embodiments of the technology, and/or algorithms, formulae, or other computational depictions, which may also be implemented as computer program products. In this regard, each block or step of a flowchart, and combinations of blocks (and/or steps) in a flowchart, algorithm, formula, or computational depiction can be implemented by various means, such as hardware, firmware, and/or software including one or more computer program instructions embodied in computer-readable program code logic. As will be appreciated, any such computer program instructions may be loaded onto a computer, including without limitation a general purpose computer or special purpose computer, or other programmable processing apparatus to produce a machine, such that the computer program instructions which execute on the computer or other programmable processing apparatus create means for implementing the functions specified in the block(s) of the flowchart(s).

Accordingly, blocks of the flowcharts, algorithms, formulae, or computational depictions support combinations of means for performing the specified functions, combinations of steps for performing the specified functions, and computer program instructions, such as embodied in computer-readable program code logic means, for performing the specified functions. It will also be understood that each block of the flowchart illustrations, algorithms, formulae, or computational depictions and combinations thereof described herein, can be implemented by special purpose hardware-based computer systems which perform the specified functions or steps, or combinations of special purpose hardware and computer-readable program code logic means.

Furthermore, these computer program instructions, such as embodied in computer-readable program code logic, may also be stored in a computer-readable memory that can direct a computer or other programmable processing apparatus to function in a particular manner, such that the instructions stored in the computer-readable memory produce an article of manufacture including instruction means which implement the function specified in the block(s) of the flowchart (s). The computer program instructions may also be loaded onto a computer or other programmable processing apparatus to cause a series of operational steps to be performed on the computer or other programmable processing apparatus to produce a computer-implemented process such that the instructions which execute on the computer or other programmable processing apparatus provide steps for implementing the functions specified in the block(s) of the flowchart(s), algorithm(s), formula (e), or computational depiction(s).

It will further be appreciated that "programming" as used herein refers to one or more instructions that can be executed by a processor to perform a function as described herein. The programming can be embodied in software, in firmware, or in a combination of software and firmware. The programming can be stored local to the device in non-transitory media, or can be stored remotely such as on a server, or all or a portion of the programming can be stored locally and remotely. Programming stored remotely can be downloaded (pushed) to the device by user initiation, or automatically based on one or more factors. It will further be appreciated that as used herein, that the terms processor, central processing unit (CPU), and computer are used synonymously to denote a device capable of executing the programming and communication with input/output interfaces and/or peripheral devices.

From the description herein, it will be appreciated that that the present disclosure encompasses multiple embodiments which include, but are not limited to, the following:

1. An apparatus for analysis and recovery of structure in an image inpainting process after object removal, comprising: (a) a computer processor; and (b) programming executable on the computer processor for analyzing structures about a missing object area within a received image toward recovering structures inside the missing object area and performing inpainting of the missing object area according to the recovered structure by performing steps comprising: (b)(i) detecting structure edges, extensions and intersections for a missing object area being inpainted within an image; (b)(ii) deciding which structure edges to extend; (b)(iii) extending structure edges into the missing object area in response to color and depth information; (b)(iv) synthesizing structure regions into the missing object area; and (b)(v) synthesizing remaining missing object area outside of structure regions to complete inpainting of the removed object area.

2. The apparatus of any preceding embodiment, wherein said programming executable on the computer processor is configured for detecting structure edges, extensions and intersections for a missing object area after determining a bounding box for the missing object area.

3. The apparatus of any preceding embodiment, wherein said programming executable on the computer processor is configured for determining said bounding box in response to cropping around the missing object area with added spatial margins.

4. The apparatus of any preceding embodiment, wherein said programming executable on the computer processor is configured for determining said added spatial margins in response to utilizing predetermined thresholds, fixed number of pixels, percentage of the average image size, variable based on image and/or application, or combination thereof for extending the boundary.

5. The apparatus of any preceding embodiment, wherein said structure edges are those which reach the missing object area.

6. The apparatus of any preceding embodiment, wherein said programming executable on the computer processor is configured for deciding which structure edges to extend, and determining intersections of extended structure edges, based on color and depth information for those structure edges.

7. The apparatus of any preceding embodiment, wherein said programming executable on the computer processor is configured for deciding an extent to which structure edges are to be extended into the missing object area based on color and depth information.

8. The apparatus of any preceding embodiment, wherein said programming executable on the computer processor is configured for synthesizing remaining missing object area which comprises regions within the missing object area but outside of structure regions.

9. The apparatus of any preceding embodiment, wherein said remaining missing object area comprises homogeneous regions of the image.

10. The apparatus of any preceding embodiment, wherein said programming executable on the computer processor is configured for detecting structure edges, extensions and intersections for a removed object area being inpainted within an image, in response to: (a) determining which structure edges are adjacent the missing object area, as edges which intersect a boundary of the missing object area; (b) classifying these structure edges into three general categories: (b)(i) structure edges arising from object boundaries and prominent edges on the object surfaces; (b)(ii) texture edges arising in response to texture patterns, which are discernable by being short and curvy; (b)(iii) short edges arising from noise and variance in illumination; and (c) considering only said structure edges, and not texture edges or noise edges, for extension and intersections within the missing object area.

11. The apparatus of any preceding embodiment, wherein said programming executable on the computer processor is configured for restoring structural elements within the inpainted region of the missing object area.

12. An apparatus for analysis and recovery of structure in an image inpainting process after object removal, comprising: (a) a computer processor; and (b) programming executable on the computer processor for analyzing structures about a missing object area of an image toward recovering structures inside the missing object area and performing inpainting of the missing object area according to the recovered structure by performing steps comprising: (b)(i) detecting structure edges, extensions and intersections for a missing object area being inpainted within an image; (b)(ii) deciding which structure edges to extend based on determining which structure edges are adjacent the missing object area, as edges which intersect a boundary of the missing object area, followed by classifying these structure edges into three general categories of structure edges arising from object boundaries and prominent edges on the object surfaces, texture edges arising in response to texture patterns discernable by being short and curvy, and short edges arising from noise and variance in illumination, with only said structure edges, and not texture edges or noise edges, being considered for extension and intersections within the missing object area; (b)(iii) extending structure edges into the missing object area in response to color and depth information; (b)(iv) synthesizing structure regions into the missing object area; and (b)(v) synthesizing remaining missing object area outside of structure regions to complete inpainting of the missing object area.

13. The apparatus of any preceding embodiment, wherein said programming executable on the computer processor is configured for detecting structure edges, extensions and intersections for a removed object area after determining a bounding box for the missing object area.

14. The apparatus of any preceding embodiment, wherein said programming executable on the computer processor is configured for determining said bounding box in response to cropping around the missing object area with added spatial margins.

15. The apparatus of any preceding embodiment, wherein said programming executable on the computer processor is configured for determining said added spatial margins in response to predetermined thresholds, fixed number of pixels, percentage of the average image size, variable based on image or application, or combination thereof.

16. The apparatus of any preceding embodiment, wherein said programming executable on the computer processor is configured for deciding which structure edges to extend, and determining intersections of extended structure edges, based on color and depth information for those structure edges.

17. The apparatus of any preceding embodiment, wherein said programming executable on the computer processor is configured for deciding an extent to which structure edges are to be extended into the missing object area based on color and depth information.

18. The apparatus of any preceding embodiment, wherein said programming executable on the computer processor is configured for synthesizing remaining missing object area which comprises regions within the missing object area but outside of structure regions.

19. The apparatus of any preceding embodiment, wherein said programming executable on the computer processor is configured for restoring structural elements within the inpainted region of the missing object area.

20. A method for analysis and recovery of structure in an image inpainting process after object removal, comprising: (a) detecting structure edges, extensions and intersections for a missing object area being inpainted within an image by an electronic image processing device; (b) deciding which structure edges to extend, while ignoring texture edges and noise edges; (c) extending structure edges into the missing object area in response to utilizing color and depth information; (d) synthesizing structure regions into the missing object area; and (e) synthesizing remaining missing object area outside of structure regions to complete inpainting of the removed object area.

Although the description herein contains many details, these should not be construed as limiting the scope of the disclosure but as merely providing illustrations of some of the presently preferred embodiments. Therefore, it will be appreciated that the scope of the disclosure fully encompasses other embodiments which may become obvious to those skilled in the art.

In the claims, reference to an element in the singular is not intended to mean "one and only one" unless explicitly so stated, but rather "one or more." All structural and functional equivalents to the elements of the disclosed embodiments that are known to those of ordinary skill in the art are expressly incorporated herein by reference and are intended to be encompassed by the present claims. Furthermore, no element, component, or method step in the present disclosure is intended to be dedicated to the public regardless of whether the element, component, or method step is explicitly recited in the claims. No claim element herein is to be construed as a "means plus function" element unless the element is expressly recited using the phrase "means for". No claim element herein is to be construed as a "step plus function" element unless the element is expressly recited using the phrase "step for".

What is claimed is:

1. A method for analysis and recovery of structure in an image inpainting process after object removal, comprising:
    (a) detecting structure edges, extensions and intersections for a missing object area being inpainted within an image by an electronic image processing device;
    (b) deciding which structure edges to extend, while ignoring texture edges and noise edges, and deciding an extent to which structure edges are to be extended into the missing object area based on color and depth information;
    (c) extending structure edges into the missing object area in response to utilizing color and depth information;
    (d) synthesizing structure regions into the missing object area; and
    (e) synthesizing remaining missing object area outside of structure regions to complete inpainting of the removed object area.

2. An apparatus for analysis and recovery of structure in an image inpainting process after object removal, comprising:
    (a) a computer processor; and
    (b) programming executable on the computer processor for analyzing structures about a missing object area within a received image toward recovering structures inside the missing object area and performing inpainting of the missing object area according to the recovered structure by performing steps comprising:
        (i) detecting structure edges, extensions and intersections for a missing object area being inpainted within an image;
        (ii) deciding which structure edges to extend, and deciding an extent to which structure edges are to be extended into the missing object area based on color and depth information;
        (iii) extending structure edges into the missing object area in response to color and depth information;
        (iv) synthesizing structure regions into the missing object area; and
        (v) synthesizing remaining missing object area outside of structure regions to complete inpainting of the removed object area.

3. The apparatus as recited in claim 2, wherein said programming executable on the computer processor is configured for detecting structure edges, extensions and intersections for a missing object area after determining a bounding box for the missing object area.

4. The apparatus as recited in claim 3, wherein said programming executable on the computer processor is configured for determining said bounding box in response to cropping around the missing object area with added spatial margins.

5. The apparatus as recited in claim 4, wherein said programming executable on the computer processor is configured for determining said added spatial margins in response to utilizing predetermined thresholds, fixed number of pixels, percentage of the average image size, variable based on image or application, or combination thereof for extending the bounding box.

6. The apparatus as recited in claim 2, wherein said structure edges are those which reach the missing object area.

7. The apparatus as recited in claim 2, wherein said programming executable on the computer processor is configured for deciding which structure edges to extend, and determining intersections of extended structure edges, based on color and depth information for those structure edges.

8. The apparatus as recited in claim 2, wherein said programming executable on the computer processor is configured for synthesizing remaining missing object area which comprises regions within the missing object area but outside of structure regions.

9. The apparatus as recited in claim 8, wherein said remaining missing object area comprises homogeneous regions of the image.

10. The apparatus as recited in claim 2, wherein said programming executable on the computer processor is configured for detecting structure edges, extensions and intersections for a removed object area being inpainted within an image, in response to:
  (a) determining which structure edges are adjacent the missing object area, as edges which intersect a boundary of the missing object area;
  (b) classifying these structure edges into three general categories:
    (i) structure edges arising from object boundaries and prominent edges on the object surfaces;
    (ii) texture edges arising in response to texture patterns, which are discernable by being short and curvy; and
    (iii) short edges arising from noise and variance in illumination; and
  (c) considering only said structure edges, and not texture edges or noise edges, for extension and intersections within the missing object area.

11. The apparatus as recited in claim 2, wherein said programming executable on the computer processor is configured for restoring structural elements within the inpainted region of the missing object area.

12. An apparatus for analysis and recovery of structure in an image inpainting process after object removal, comprising:
  (a) a computer processor; and
  (b) programming executable on the computer processor for analyzing structures about a missing object area of an image toward recovering structures inside the missing object area and performing inpainting of the missing object area according to the recovered structure by performing steps comprising:
    (i) detecting structure edges, extensions and intersections for a missing object area being inpainted within an image;
    (ii) deciding which structure edges to extend based on determining which structure edges are adjacent the missing object area, as edges which intersect a boundary of the missing object area, followed by classifying these structure edges into three general categories of structure edges arising from object boundaries and prominent edges on the object surfaces, texture edges arising in response to texture patterns discernable by being short and curvy, and short edges arising from noise and variance in illumination, with only said structure edges, and not texture edges or noise edges, being considered for extension and intersections within the missing object area, and deciding an extent to which structure edges are to be extended into the missing object area based on color and depth information;
    (iii) extending structure edges into the missing object area in response to color and depth information;
    (iv) synthesizing structure regions into the missing object area; and
    (v) synthesizing remaining missing object area outside of structure regions to complete inpainting of the missing object area.

13. The apparatus as recited in claim 12, wherein said programming executable on the computer processor is configured for detecting structure edges, extensions and intersections for a removed object area after determining a bounding box for the missing object area.

14. The apparatus as recited in claim 13, wherein said programming executable on the computer processor is configured for determining said bounding box in response to cropping around the missing object area with added spatial margins.

15. The apparatus as recited in claim 14, wherein said programming executable on the computer processor is configured for determining said added spatial margins in response to predetermined thresholds, fixed number of pixels, percentage of the average image size, variable based on image or application, or combination thereof.

16. The apparatus as recited in claim 12, wherein said programming executable on the computer processor is configured for deciding which structure edges to extend, and determining intersections of extended structure edges, based on color and depth information for those structure edges.

17. The apparatus as recited in claim 12, wherein said programming executable on the computer processor is configured for synthesizing remaining missing object area which comprises regions within the missing object area but outside of structure regions.

18. The apparatus as recited in claim 12, wherein said programming executable on the computer processor is configured for restoring structural elements within the inpainted region of the missing object area.

* * * * *